Patented Dec. 29, 1942

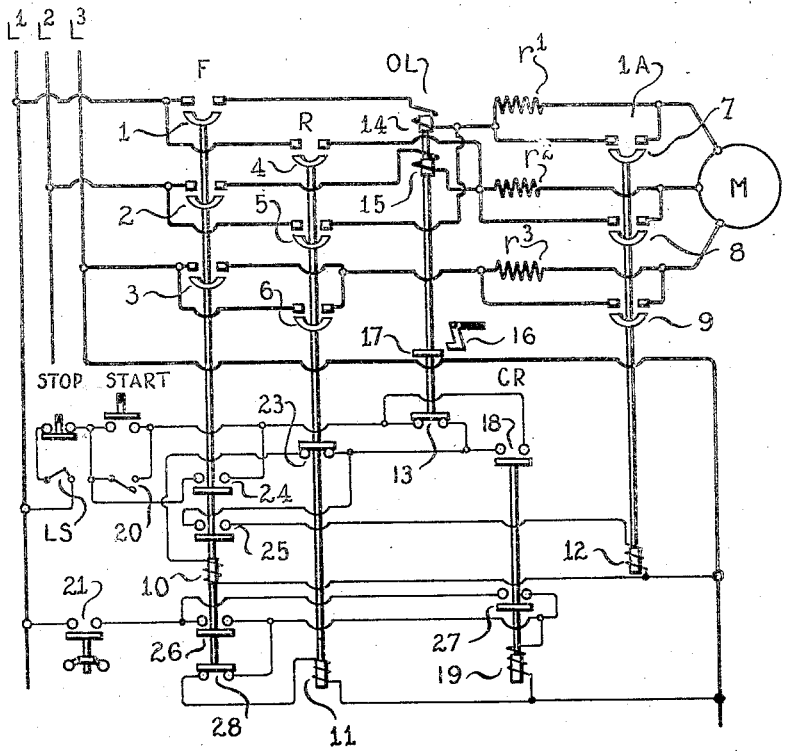

2,306,629

UNITED STATES PATENT OFFICE 2,306,629

CONTROLLER FOR ELECTRIC MOTORS

Carl W. Ludvigsen, Milwaukee, Wis., assignor to Cutler-Hammer, Inc., Milwaukee, Wis., a corporation of Delaware Application August 4, 1941, Serial No. 405,330

7 Claims. (Cl. 172—179)

This invention relates to improvements in controllers for electric motors, and is especially applicable to machine tool control.

In machine tool control it is common practice to employ an alternating current driving motor, providing for stopping thereof by plugging, and it is highly desirable to afford the driving motor some overload protection. On the other hand, it is important in some instances to continue an operating cycle once started through to completion regardless of load conditions, whereas should the driving motor stall it is of course desirable to afford automatic disconnection thereof from circuit. In some instances the tool during the operating cycle will become so highly heated that if the drive is prematurely arrested the tool will weld to the work, and this has resulted in injury to expensive tools.

An object of the present invention is to provide improved control means for motors employed in such service which will afford the necessary overload protection without stopping the motor during its working cycle and which in the event of stalling of the motor will promptly disconnect the same from circuit.

Another object is to provide such a controller characterized by both simplicity and reliability.

Various other objects and advantages of the invention will hereinafter appear.

The accompanying drawing illustrates diagrammatically one embodiment of the invention which will now be described, it being understood that the invention is susceptible of embodiment in other forms falling within the scope of the appended claims.

Referring to the accompanying drawing, there is illustrated an alternating current motor M to be supplied from an alternating current source $L^1$, $L^2$, $L^3$. The motor is adapted to be connected to lines $L^1$, $L^2$ and $L^3$ through starting resistances $r^1$, $r^2$ and $r^3$, respectively, such resistances to be excluded from circuit for running.

For connecting the motor M to lines $L^1$, $L^2$ and $L^3$ for forward operation there is provided an electroresponsive switch F having main contacts 1, 2 and 3, and for reversing the motor for plugging there is provided an electroresponsive reversing switch R having main contacts 4, 5 and 6. An electroresponsive switch 1A having contacts 7, 8 and 9 is provided for short-circuiting the resistances $r^1$, $r^2$ and $r^3$. These switches, as will be understood, control all three phases of the motor circuit, the switch 1A being controlled to respond following response of the forward switch F. Also as will be understood, contacts 1 and 2 of the forward switch F and the contacts 4 and 5 of the reversing switch R provide for reversal of the connections between two terminals of the motor and lines $L^1$, $L^2$, the reversing switch R serving by reversal of these connections to plug the motor for stopping. The switches F and R in addition to the contacts aforementioned have auxiliary contacts which will be later referred to, and these switches have operating windings 10 and 11, respectively. The switch 1A aforementioned has an operating winding 12.

To afford overload protection there is provided an overload relay OL having a single set of normally engaged contacts 13 and operating windings 14 and 15 connected in series with the motor in different phases of the motor circuit. The overload relay may be of any of the well known types, being preferably of the type which when tripped remains tripped until manually reset. Hence for purposes of illustration the overload relay is shown as provided with a latch 16 to engage with a cooperating member 17 to restrain the contacts 13 following disengagement thereof against reengagement pending manual tripping of the latch 16. Also in conjunction with the overload relay there is provided a relay CR having normally disengaged contacts 18 which when engaged by-pass the contacts 13 of the overload relay. Such by-passing of the relay contacts 13 of course renders response of the overload relay ineffective pending interruption of the by-pass. The CR relay has an operating winding 19 and certain auxiliary contacts hereinafter referred to.

The control shown additionally includes a manual start switch of the normally open push button type, a manual stop switch of the normally closed push button type, a limit switch LS for stopping, a switch 20 in parallel to the start push button switch and adapted to be operated by the controlled device, and a so-called zero speed switch 21 of the fly ball governor type or other preferred type to be operatively connected to the motor for closure when the motor is in operation and for opening when the motor comes to rest.

Assuming all switches to occupy the positions shown closure of the start push button switch completes circuit from line $L^1$ through the LS, stop and start switches, contacts 13 of the overload relay OL and normally closed contacts 23 of the plugging switch R to and through the winding 10 of switch F to line $L^3$. Switch F is thus rendered responsive to start the motor whereas it would not respond should switch R be energized or should the overload relay OL be in tripped position. Also switch F in responding engages its auxiliary contacts 24 to shunt the start push button switch to establish for itself a maintaining circuit independent of the latter switch but not independent of the overload relay OL.

Additionally switch F in responding engages its auxiliary contacts 25 to establish circuit from the contacts 13 of overload relay OL to and through the winding 12 of switch 1A to line L³. Switch 1A is thus rendered responsive to short circuit the resistance in the motor circuit for running, whereas switch 1A is subject to deenergization upon deenergization of switch F. In practice it may be desired to afford the contacts 25 of switch F delayed action, and as will be understood any of the well known means may be employed for this purpose.

Also switch F in responding acts through engagement of its auxiliary contacts 26 to complete circuit from line L¹ through the speed responsive switch 21 and said contacts 26 to and through the winding 19 of switch CR to line L³. Switch CR is thus rendered responsive to engage its contacts 18, thereby shunting the contacts 13 of the overload relay OL and hence together with auxiliary contacts 24 of switch F affording switch F a maintaining circuit independent of the overload relay as well as independent of the start switch. Also switch CR establishes through its auxiliary contacts 27 a maintaining circuit for itself independent of contacts 26 of switch F.

Neglecting possible stalling of the motor provision is thus made for continuing each working cycle until limit switch LS trips, without influence by tripping of the overload relay following response of the CR switch. In the event of an overload the relay OL trips and remains in tripped position, but without effect until the motor is stopped and it is attempted to restart it.

When limit switch LS trips it deenergizes switch F and switch 1A and while deenergization of switch F effects opening of its auxiliary contacts 26 switch CR remains energized because of the maintaining circuit through its auxiliary contacts 27. Also switch F when deenergized acts through re-engagement of its normally closed contacts 28 to connect winding 11 of plugging switch R across lines L¹ and L³ through the contacts 27 of switch CR and the contacts of the speed responsive switch 21. Switch R is thus rendered responsive to effect plugging and stopping of the motor.

As the motor comes to rest the speed responsive switch 21 opens to deenergize switches R and CR, thus restoring the control to the condition shown unless meanwhile the overload relay has responded, in which event the contacts 13 thereof would be open instead of closed as shown.

Should the motor become stalled during an operating cycle then the switch 21 opens to deenergize switch CR to interrupt the shunt around contacts 13 of the overload relay. Thus assuming the overload relay to have been tripped open by stalling of the motor, opening of switch CR deenergizes switch F, thereby disconnecting the motor from circuit and preventing restarting until the overload relay is manually reset.

As will be apparent, the stop push button switch provides means for stopping at will, whereas the switch 20 affords a means whereby starting may be made automatic in certain positions of the driven device where this is desired.

What I claim as new and desire to secure by Letters Patent is:

1. In combination, a motor, starting means therefor including overload protective means for the motor requiring manual resetting following response thereof and means responsive automatically during starting to render response of said overload means ineffective throughout a given cycle of operation unless the motor stalls, said second mentioned means ceasing to so function upon stalling of the motor during said given cycle of operation.

2. In combination, a motor, an overload protective device for the motor requiring manual resetting to normal position following response thereof, means for starting the motor but only when said overload device is in normal position, said means providing for a given cycle of operation of the motor with said overload device responsive to an overload on the motor at any time during such cycle and means to maintain running connections for the motor throughout said cycle free from influence by said overload device unless the motor stalls, and upon stalling of the motor rendering said overload device effective.

3. The combination with a motor and means to effect operation of the motor and stopping of the motor by plugging, said means including means responsive to overloading of the motor and tending upon response to effect disconnection of the motor from circuit, of means operable automatically to render response of said overload responsive means during a given cycle of operation ineffective to disconnect the motor from circuit unless the motor stalls, said automatically operable means being responsive to stopping of the motor by plugging or by stalling and thereupon becoming inactive pending restarting of the motor.

4. In combination, a motor, starting means therefor including an overload protective switch for the motor requiring resetting manually following response thereof, and means responsive automatically during starting to bypass the contacts of said overload switch throughout a given cycle of operation unless the motor stalls, said second mentioned means being operable automatically upon stalling of the motor to interrupt said bypass pending restarting of the motor.

5. The combination with a motor and means to effect operation of the motor and stopping thereof by plugging, said means including an overload responsive switch tending upon response to disconnect the motor from circuit and requiring manual resetting following response, of means operable automatically following starting of the motor to bypass the contacts of said overload switch, the last mentioned means being tripped by stopping of the motor by plugging or stalling and thereupon interrupting said bypass pending restarting of the motor.

6. The combination with a motor and means to effect operation of the motor and stopping thereof by plugging, said means including an overload responsive switch tending upon response to disconnect the motor from circuit and requiring manual resetting following response, of electroresponsive means responsive to bypass the contacts of said overload means and means to energize said electroresponsive means following starting of the motor and to maintain it energized subject to deenergization by stopping of the motor through plugging or earlier stalling.

7. The combination with a motor and means to effect operation of the motor and stopping thereof by plugging, said means including an overload responsive switch tending upon response to disconnect the motor from circuit and requiring manual resetting following response, of electroresponsive means responsive to bypass the contacts of said overload means and means to energize said electroresponsive means following starting of the motor and to maintain it energized subject to deenergization by stopping of the motor through plugging or earlier stalling, said electroresponsive means when deenergized being unresponsive until after restarting of the motor.

CARL W. LUDVIGSEN.